United States Patent [19]

Deichert et al.

[11] 4,341,889

[45] Jul. 27, 1982

[54] POLYSILOXANE COMPOSITION AND BIOMEDICAL DEVICES

[75] Inventors: William G. Deichert, Macedon; Gary D. Friends, Ontario; John B. Melpolder, Hilton; Joon S. Park, Rochester, all of N.Y.

[73] Assignee: Bausch & Lomb Incorporated, Rochester, N.Y.

[21] Appl. No.: 238,525

[22] Filed: Feb. 26, 1981

[51] Int. Cl.³ .................... C08G 77/14; C08F 220/06
[52] U.S. Cl. ...................... 528/26; 525/479; 526/279; 528/25; 351/160 R
[58] Field of Search .......... 528/26; 526/279; 525/479

[56] References Cited

U.S. PATENT DOCUMENTS

| | | | |
|---|---|---|---|
| 3,808,178 | 4/1930 | Gaylord | 528/26 |
| 4,136,250 | 6/1979 | Mueller et al. | 528/29 |
| 4,152,508 | 5/1979 | Ellis et al. | 526/279 |
| 4,153,641 | 5/1979 | Deichert et al. | 526/279 |
| 4,189,546 | 2/1980 | Deichert et al. | 528/26 |
| 4,208,506 | 6/1980 | Deichert et al. | 528/32 |
| 4,228,269 | 10/1980 | Loshaek et al. | 526/346 |
| 4,243,790 | 6/1981 | Foley et al. | 526/320 |
| 4,277,595 | 7/1981 | Deichert et al. | 528/26 |

FOREIGN PATENT DOCUMENTS 2036765 7/1980 United Kingdom .

*Primary Examiner*—Wilbert J. Briggs, Sr.
*Attorney, Agent, or Firm*—Robert M. Phipps

[57] ABSTRACT

Monomeric polysiloxanes endcapped with activated unsaturated groups are copolymerized with a modulus modifier and tear film stabilizers to form hard, gas permeable, polysiloxane contact lenses and other biomedical devices.

17 Claims, No Drawings

POLYSILOXANE COMPOSITION AND BIOMEDICAL DEVICES

BACKGROUND OF THE INVENTION

1. Field of the Invention

This invention relates to hard, gas permeable, biomedical devices including contact lenses prepared from monomeric polysiloxanes polymerized with a modulus modifier and a tear film stabilizer.

2. Prior Art Statement

U.S. Pat. No. 3,808,178 discloses contact lenses fabricated from a copolymer of a polysiloxanylalkyl acrylic ester and an alkyl acrylic ester. The copolymer is said to have increased oxygen permeability. Wettability can be imparted to the copolymer by the addition of about 0.1 to about 10 percent by weight of one or more hydrophilic monomers such as hydroxyalkyl acrylates and methacrylates, acrylic and methacrylic acid, acrylamide, glycidyl acrylate and N-vinyl pyrrolidinone.

U.S. Pat. No. 4,136,250 teaches, in part, a water absorbing polysiloxane which may be used to make soft contact lenses. The polymer is obtained by copolymerizing a siloxane monomer with a variety of hydrophilic monomers, e.g., acrylic acid or a mixture of hydrophilic and hydrophobic monomers, styrene can be included in the mixture. The siloxane monomers can be reduced to a formula similar to but yet critically different from the instant polyorganosiloxane monomers. From U.S. Pat. No. 4,136,250 the following siloxane monomer may be derived:

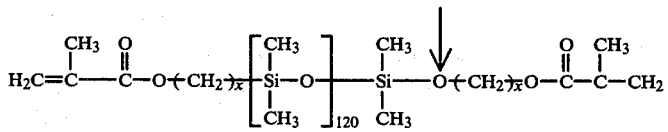

In the formula the oxygen atom with the arrow pointing to it is present in the '250 formula but not present in the instant polyorganosiloxane monomers of this invention. This oxygen atom, because of its placement between the silicone and carbon atoms, is subject to hydrolysis and alcoholysis. Stability is important if this material is to be used for biomedical devices, such as contact lenses, since these types of devices are usually heated in the presence of water in order to disinfect them. If, during heating the contact lens loses its shape, then it loses its optics. This means that the material taught in '250 would be undesirable for use in certain medical devices including contact lenses.

U.S. Pat. No. 4,152,508 discloses hard contact lenses having a high oxygen permeability. The lens material is a copolymer of a siloxanylalkyl ester monomer, and itaconate ester and an ester of acrylic or methacrylic acid. Representatives of itaconate esters include phenyl itaconate, diphenyl itaconate and methyl phenyl itaconate.

U.S. Pat. No. 4,153,641 discloses contact lenses made from polymers and copolymers comprising poly(organosiloxane) polymers and copolymers formed by polymerizing a poly(organosiloxane) monomer α,ω terminally bonded through divalent hydrocarbon groups to polymerized, free radical polymerizably activated, unsaturated groups forming a polymer in a crosslinked network. Additionally, specific comonomers are disclosed which include lower esters of acrylic and methacrylic acids, styryls (including vinyl ethyl benzene and styrene) and N-vinyl pyrrolidinone which may be copolymerized with the above described poly(organosiloxane) monomer to form a copolymer. The instant invention preferred polysiloxane monomers include these poly(organosiloxane) monomers.

U.S. Pat. No. 4,189,546 discloses shaped articles for biomedical uses other than contact lenses made from polymers and copolymrs comprising poly(organosiloxane) polymers and copolymers formed by polymerizing a poly(organosiloxane) monomer α,ω terminally bonded through divalent hydrocarbon groups to polymerized, free radical polymerizably activated, unsaturated groups forming a polymer in a crosslinked network. Additionally, specific comonomers are disclosed which include lower esters of acrylic and methacrylic acids, styryls (including tertiary-butyl styrene and propyl styrene) and N-vinyl pyrrolidinone which may be copolymerized with the above described poly(organosiloxane) monomer to form a copolymer. The instant invention preferred polysiloxane monomers include these same poly(organosiloxane) monomers.

U.S. Pat. No. 4,208,506 discloses soft contact lenses made from polymers and copolymers comprising polyparaffinsiloxane polymers and copolymers formed by polymerizing a polyparaffinsiloxane monomer α,ω terminally bonded through divalent hydrocarbon groups to polymerized, free radical polymerizably activated, unsaturated groups forming a polymer in a crosslinked network. Additionally, specific comonomers are disclosed which include lower esters of acrylic and methacrylic acid, styryls and N-vinyl pyrrolidinone which may be copolymerized with the above described polyparaffinsiloxane monomer to form a copolymer. The instant invention preferred polysiloxane monomers include the same polyparaffinsiloxane monomers.

U.S. Pat. No. 4,228,269 discloses contact lenses and blanks for same are made by polymerizing at least one styrene type monomer, optionally with at least one crosslinking monomer and optionally with other monoolefinically unsaturated monomers. Preferably the styrene monomer is a styrene substituted in the ring by at least one alkyl group, e.g., tertiary-butyl styrene and/or isopropyl styrene. The lenses have high gas permeability.

U.K. patent application No. 2,036,765 discloses soft contact lenses comprised of a hydrated copolymer of a major proportion of an hydroxyalkyl acrylate or methacrylate, up to 12% by weight of any ethylenically unsaturated acid or anhydride, a major proportion of a crosslinking monomer and a minor proportion of styrene or substituted styrene, the free acid or anhydride groups being in bulk form. The reinforcing effect of the styrene in the copolymer can be increased by incorporating it in more concentrated sequence, e.g., as a block copolymer.

U.S. Pat. No. 4,243,790 discloses gas permeable contact lenses made from a copolymer of styrene and acrylate ester or hydroxy acrylate ester with optionally up to about 10% methacrylic acid. A preferred soft lens composition is 20% to 30% styrene, 2% to 3% methacrylic acid, 1% crosslinking agent and the balance acrylate material. With styrene percentages of 40% to 80%, methacrylic acid should not be added as poor optical properties may result.

U.S. Pat. No. 4,277,595, granted on application Ser. No. 074,944 by William G. Deichert et al, discloses monomeric polysiloxanes endcapped with activated unsaturated groups polymerized with acrylic acid to form a soft contact lens. The acrylic acid is present in an amount from about 5 to 30 weight percent of the total polymer. These instant polysiloxane copolymer soft contact lenses have unexpectedly high water absorption and are hydrophilic.

U.S. Pat. No. 4,276,402, granted on application Ser. No. 075,365 by Richard E. Chromecek et al, discloses monomeric polysiloxanes endcapped with activated unsaturated groups polymerized with acrylic acid and polycyclic ester of acrylic acid or methacrylic acid to form a soft contact lens. The polycyclic monomer is present in an amount from about 5 to 50 weight percent of the total polymer and the acrylic acid is present in an amount from 1 to about 30 weight percent. These terpolymer soft contact lenses have unexpectedly high tensile strengths and improved tear strengths as compared to copolymers of polysiloxane and acrylic acid.

SUMMARY OF THE INVENTION

In accordance with this invention, biomedical devices, including optical contact lenses, are provided which are made from three dimensional network polymerizates of (1) polysiloxanes $\alpha,\omega$ terminally bonded through a divalent hydrocarbon group to an activated, unsaturated group, (2) tertiary-butyl styrene modulus modifier and (3) a tear film stabilizer.

The present invention provides materials which can be usefully employed for the fabrication of prostheses such as heart valves and intraocular lenses, optical contact lenses or films. More particularly, the instant invention concerns contact lenses.

DESCRIPTION OF THE PREFERRED EMBODIMENTS

The monomers employed in accordance with this invention are readily polymerized to form three-dimensional polymeric networks which permit the transport of oxygen and are optionally clear, strong and hard.

The preferred polysiloxanes employed are (1) poly(organosiloxanes) of the formula

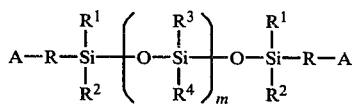

or, (II) polyparaffinsiloxanes of the formula

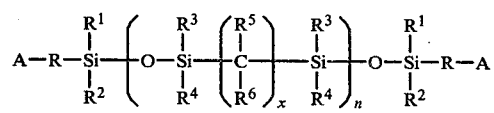

wherein A is an activated unsaturated group; R is a divalent hydrocarbon radical having from 1 to about 22 carbon atoms; $R^1$, $R^2$, $R^3$ and $R^4$ are each independently selected from the group consisting of a monovalent hydrocarbon radical having from 1 to about 12 carbon atoms and a halogen substituted monovalent hydrocarbon radical having from 1 to about 12 carbon atoms; $R^5$ and $R^6$ can be the same or different and are selected from the group consisting of hydrogen, a hydrocarbon radical containing from 1 to about 12 carbon atoms, a carboxylic acid group, a carboxylic acid ester group represented by the formula $—C(O)OR^7$ wherein $R^7$ is selected from the group consisting of a hydrocarbon group containing from 1 to about 12 carbon atoms and a carboxylic acid amide represented by the formula $—C(O)NR^8R^9$ wherein $R^8$ and $R^9$ can be the same or different and each is selected from the group consisting of hydrogen and a hydrocarbon group containing from 1 to about 12 carbon atoms; x is from 2 to 25, m is an integer from 0 to 100 and n is an integer from 1 to 100. More preferably m will be from 0 to 50 and most preferably from 0 to 25. Desirably n will be from 1 to 50 and more preferably from 1 to 25. Desirably x will be from 2 to 10 and more preferably is 2 or 3.

The term "an activated unsaturated group" refers to a group which has a substituent which functions through resonance to increase the free radical stability or activity of the double bond, thereby facilitating free radical polymerization of the monomer. These activated unsaturated groups will polymerize to form a polymer with a crosslinked three-dimensional network. Preferably the activating groups present are such that the monomers lend themselves to polymerization under mild conditions. Preferred activating groups include:

| | |
|---|---|
| 2-cyanoacryloxy | CH$_2$:C(C:N)C(O)O— |
| acrylonitryl | CH$_2$:C(C:N)— |
| acrylamido | CH$_2$:CHC(O)NH— |
| acryloxy | CH$_2$:CHC(O)O— |
| methacryloxy | CH$_2$:C(CH$_3$)C(O)O— |
| styryl | CH$_2$:CHC$_6$H$_4$— |
| N—vinyl-2-pyrrolidinone-x-yl wherein x may be 3,4 or 5 | |

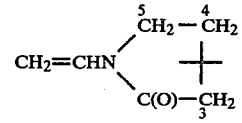

The more preferred polysiloxane is the poly(organosiloxane) of formula I above. In the preferred embodiment A is acryloxy or methacryloxy and more preferably methacryloxy.

R is preferably an alkylene radical such as methylene, propylene, butylene, pentamethylene, hexamethylene, octamethylene, dodecalmethylene, hexadecalmethylene and octadecalmethylene. However, R can also be an arylene radical such as phenylene or biphenylene. More preferably R is an alkylene radical of 1,3 or 4 carbon atoms and most preferably 3 or 4, e.g., butylene.

Preferably, $R^1$, $R^2$, $R^3$ and $R^4$ are alkyl radicals having from 1 to 12 carbon atoms, e.g., methyl, ethyl, propyl, butyl, octyl, dodecyl and the like; cycloalkyl radicals, e.g., cyclopentyl, cyclohexyl, cycloheptyl and the like, mononuclear and binuclear aryl radicals, e.g., benzyl, phenylethyl, phenylpropyl, phenylbutyl and the like; alkaryl radicals, e.g., tolyl, xylyl, ethylphenyl and the like; haloaryl radicals such as chlorophenyl, tetrachlorophenyl, difluorophenyl and the like; halo substituted lower alkyl radicals having up to about four alkyl carbon atoms such as fluoromethyl and fluoropropyl. More preferably $R^1$, $R^2$, $R^3$ and $R^4$ are methyl radicals and phenyl radicals, most preferably each substituent is methyl.

Preferably $R^5$ and $R^6$ are selected from the group consisting of hydrogen, hydrocarbon containing from 1 to about 6 carbon atoms and a carboxylic acid group. More preferably $R^5$ and $R^6$ are selected from the group consisting of hydrogen and methyl.

Preferably $R^7$ is a hydrocarbon group containing from 1 to about 6 carbon atoms and most preferably is methyl.

Preferably $R^8$ and $R^9$ are each selected from the group consisting of hydrogen and hydrocarbon containing from 1 to about 4 carbon atoms. Most preferably $R^8$ and $R^9$ are each selected from the group consisting of hydrogen and methyl.

The polyparaffinsiloxane monomers employed in this invention are prepared according to the method disclosed in U.S. patent 4,208,506 granted June 17, 1980.

The method of preparation of the poly(organosiloxane) monomer is disclosed in U.S. Pat. No. 4,153,641 granted May 8, 1979.

The second component of the polymer of this invention is the modulus modifier. In the present polymer system, tertiary-butyl styrene has been found to uniquely function as a modulus modifier with oxygen permeability retention characteristics. The modulus modifier of this invention materially improves the modulus (stiffness) of the polysiloxane while not significantly impairing the polysiloxane's oxygen permeability. The polymer of this invention has a tangent modulus of eleasticity, hereinafter for convenience referred to as TE modulus, of at least 25,000 g/mm$^2$. This modulus value is determined by ASTM D 1708. While many other compounds can increase, or be expected to increase, the TE modulus of the polysiloxane these compounds have an unacceptable adverse affect on the oxygen permeability property of the polysiloxane.

The relative hardness (or softness) of the contact lenses, i.e., polymer of this invention can be varied by the amount of tertiary-butyl styrene employed. Further small changes in the relative hardness can be obtained by decreasing or increasing the molecular weight of the monomeric polysiloxane endcapped with the activated, unsaturated groups. As the ratio of siloxane units to endcap units increases, the softness of the material increases. Conversely, as this ratio decreases, the rigidity and hardness of the material increases.

The interaction of the TE modulus and oxygen permeability characteristics of the polysiloxane polymer is a critical aspect of the invention. These values are correlated by the use of MOP values. The polymers of this invention have an MOP value of at least 2.5 as hereinafter described.

Tertiary-butyl styrene is present in an amount from 80 to 40 parts by weight per 20 to 60 parts by weight of the above described polysiloxane monomers. In each event, the total parts of modifier and polysiloxane present are 100 parts. More preferably the modifier is present in the amount of 80 to 60 parts, more preferably yet the modifier is 70 parts.

The third component of the polymeric composition of this invention is the tear film stabilizer hydrophilic monomer. The stabilizer is present in an amount of 2 to 20 parts by weight for each 100 parts of polysiloxane and modulus modifier. More preferably, the stabilizer will be employed in the amount of 3 to 12 parts. Most preferably the stabilizer will be present in an amount of 5 to 9 parts.

While not wishing to be bound by any particular rationale, it appears that contact lenses on introduction to the eye tend to alter the layers of material over or on the cornea and inhibit the formation of a film over the contact lens. It is believed that the incorporation of a tear film stabilizer into the polymer matrix permenently reduces or avoids the film formation problem and allows tear fluids to coat the lens. The prior art has sought to achieve this effect, in part, by the use of hydrophilic coatings on the lenses but the coatings are subject to removal on repeated handling of the lenses.

The tear film stabilizer is a hydrophilic monomer preferably selected from the group consisting of acrylic acid, methacrylic acid, hydroxyethyl acrylate, hydroxyethyl methacrylate, hydroxypropyl acrylate, hydroxypropyl methacrylate and mixtures thereof. Of the foregoing stabilizers, methacrylic acid and acrylic acid are the most preferred.

Optionally, the above three component polymer system can contain from zero to 30 parts by weight, based on weight of polysiloxane and modulus modifier, of an auxiliary modifier. These auxiliary modifiers are reactive with the three components of this invention. Minor but often desirable changes of physical properties, e.g., tear strength and tensile strength, are obtained by the use of auxiliary modifiers.

Useufl auxiliary modifiers include, but are not limited to, tertiary-butyl acrylate, polyethylene glycol acrylate, neopentyl glycol diacrylate, neopentyl glycol dimethacrylate, polyethylene glycol diacrylate, polyethylene glycol methacrylate, polyethylene glycol dimethacrylate, divinyl benzene, especially divinyl alkyl benzenes, e.g., divinyl toluene, 1,3-bis(4-methacryloxybutyl) tetramethyl disiloxane and mixtures thereof. The foregoing polyethylene glycols will contain from 2 to 9 repeating ethylene glycol units.

The polysiloxanes $\alpha,\omega$ terminally bonded through a divalent hydrocarbon group to an activated unsaturated group, i.e., the monomers herein are generally clear, colorless liquids whose viscosity depends on the value of m or n. These monomers can be readily cured to cast shapes by conventional methods such as free radical initiators.

The preferred contact lens may be shaped by molding or lathe cutting, such as taught in U.S. Pat. Nos. 4,084,459 and 4,197,266 or the various other processes known in the art. Illustrative of free radical initiators which can be employed are bis(isopropyl) peroxy dicarbonate, azobisisobutyronitrile, benzoin methyl ether, acetyl peroxide, lauroyl peroxide, decanoyl peroxide, benzoyl peroxide, tertiarybutyl peroxypivalate and the like.

The process of lengthening the siloxane portion of the monomer is referred to herein as siloxane ring insertion. The number average chain length of the polysiloxane center unit of the monomers may be as high as 100.

The term polymerization is used to refer to the polymerization of the polysiloxanes endcapped with polymerizable activated unsaturated groups which results in a crosslinked three-dimensional polymeric network.

"A polysiloxane terminally bonded through a divalent hydrocarbon group to an activated, unsaturated group" means the described polysiloxane compound has been attached to a divalent hydrocarbon group, such as methylene or propylene and then at the end of this group is attached an activated, unsaturated group and this then is the most preferred siloxane monomer. Then when these monomers are polymerized (free radical polymerization) with other activated unsaturated monomers, three-dimensional polymer networks are obtained. This polymerized material is from what the biomedical devices, including contact lenses, are made.

The advantages of using the contact lenses, i.e., polymers of the instant invention which are made from the monomers disclosed herein are numerous. For example, the advantages of using activated vinyl terminal groups to cure the siloxane material include no fillers being needed to get useful physical strength as is common with most silicone resins in contact lenses. This is desirable since the use of fillers requires that other, possibly undesirable, materials be added to the composition in order to match the refractive index of the polymer to the filler.

Furthermore, the contact lenses made from the polymer of the instant invention are oxygen permeable. A critical oxygen tension and flux under a lens should be about 10 mmHg and 2 ml/(cm$^2$ hr.) respectively below which corneal swelling occurs, Polse and Decker, *Investigative Ophthalmology and Visual Science*, vol. 18, p 188, 1979. In order to meet these requirements, the lens material must have adequate oxygen permeability. When m in formula I and n in II above are at least about 4, the chain of siloxane is long enough in the instant composition to exceed the oxygen requirements of the cornea. However, in specific situations m and n may be as low as 0.

Finally, these lenses are hydrolytically stable meaning that when the contact lenses are placed into an aqueous solution, e.g., on the eye, or during the disinfecting step, i.e., water plus heat, the lenses will not change in chemical composition, i.e., hydrolyze.

The most preferred contact lens of the instant invention is a fillerless, oxygen permeable, hydrolytically stable, biologically inert, transparent, hard, polymeric contact lens comprising a poly(organosiloxane) terminally bonded through a divalent hydrocarbon group to a polymerized activated, unsaturated group. These most preferred contact lenses have an oxygen permeability of at least about $10 \times 10^{-11}$ cm$^3$ cm/(sec.cm$^2$ mmHg), are hydrolytically stable, hard, resilient, biologically inert, transparent and have a TE modulus of 25,000 g/mm$^2$ or more.

The polymers of this invention can be formed into contact lenses by the spincasting process as disclosed in U.S. Pat. Nos. 3,408,429 and 3,496,254 and other conventional methods such as compression molding as disclosed in U.S. Pat. Nos. 4,084,459 and 4,197,266.

These polymers can be used to make biomedical devices, i.e., shaped articles such as dialyzer diaphragms, to prepare artificial kidneys and other biomedical implants such as disclosed in Wichterle, U.S. Pat. No. 2,976,576. The instant polymers can be used in preparing therapeutic bandages as disclosed in Shephard, U.S. Pat. No. 3,428,043. These polymers can also be used in preparing medical surgical devices, e.g., heart valves, vessel substitutes, intrauterine devices, membranes and other films, dialyzer diaphragms, catheters, mouth guards, denture liners and other such devices as disclosed in Shephard, U.S. Pat. Nos. 3,520,949 and 3,618,231.

The terms "shaped article for use in biomedical applications" or "biomedical device" mean the materials disclosed herein have physiochemical properties rendering them suitable for prolonged contact with living tissue, blood and the mucous membranes. These properties are required for biomedical shaped articles such as surgical implants, blood dialysis devices, blood vessels, artifical ureters, artificial breast tissue and membranes intended to come in contact with body fluid outside of the body, e.g, membranes for kidney dialysis and heart/lung machines and the like. It is known that blood, for example, is rapidly damaged in contact with artificial surfaces. The design of a synthetic surface whic is antithrombogenic and nonhemolytic to blood is necessary for prostheses and devices used with blood. The polymers and copolymers are compatible with living tissue.

The polymers and copolymers disclosed herein can be boiled and/or autoclaved in water without being damaged whereby sterilization may be achieved. Thus, an article formed from the disclosed polymers and copolymers may be used in surgery where an article compatible with living tissue or with the mucous membranes may be used.

The following examples are illustrative only and should not be construed as limiting the invention. All parts and percents referred to herein are on a weight basis and all viscosities measured at 25° C. unless otherwise specified.

EXAMPLE I

To a three-neck reaction vessel equipped with a mechanical stirrer and calcium sulfate drying tube is charged 810.1 parts of octamethylcyclotetrasiloxane, 182.8 parts of 1,3-bis(4-methacryloxybutyl) tetramethyl disiloxane and 2.5 parts of trifluoromethane sulfonic acid. The reaction proceeds at room temperature. After a reaction time of three hours, the catalyst is neutralized with a 10 fold excess (13.9 parts) of sodium bicarbonate. Stirring is continued for about three hours to insure complete neutralization. The crude reaction product is filtered through an activated alumnia (F20 grade) and Celite ® brand diatomaceous earth packed column. The resulting filtrate is freed of volatiles by passing it over a thin film evaporator operating at 110° C. temperature and 0.25 torr pressure. The final prepolymer product has a viscosity of 0.28±0.05 stokes and approximate average of 25 dimethylsiloxy repeating units.

EXAMPLE II

Example I is repeated except that 890.4 parts of octamethylcyclotetrasiloxane and 100.6 parts of 1,3-bis(4-methacryloxybutyl) tetramethyl disiloxane are used. The resulting prepolymer resin has approximate average of 50 dimethylsiloxy repeating units.

EXAMPLE III

A casting solution is prepared by mixing together 60 parts of the prepolymer resin of Example II, 40 parts of tertiary-butyl styrene, 3 parts of acrylic acid and 3 parts of tertiary-butyl peroctoate catalyst. The solution is cast between glass plates. The casting is maintained at 40° C. for one-half hour and then 60° C. for approximately one hour to obtain a film which is removed from between the plates and then devolatilized for 15 minutes at 80° C. Physical test values obtained on the film are as follows:

| | |
|---|---|
| Tensile Strength, Ultimate | 1,463 g/mm$^2$ |
| TE Modulus (ASTM D1708) | 49,800 g/mm$^2$ |
| Elongation, Ultimate | 149% |
| Tear Strength (ASTM 1938) | |
| Initial | 406 g/mm of thickness |
| Propogation | 369 g/mm of thickness |
| Tear Strength (Modified | |

-continued

| | |
|---|---|
| ASTM 1004) | 2,580 g/mm of thickness |
| Oxygen Permeability - Approx. | $100 \times 10^{-11}$ cm$^3$ cm/(sec.cm$^2$mmHg) |

A typical oxygen permeability value for polyhydroxyethylmethacrylate (PHEMA) hydrogel is $8.0 \times 10^{-11}$cm$^3$ cm/(sec.cm$^2$ mmHg). PHEMA is a widely used soft contact lens material. For convenience, PHEMA is used as a base standard in discussing oxygen permeability. Thus the polysiloxane of this example can be said to have an oxygen permeability of $12.5 \times$ PHEMA.

The oxygen permeability measurements were made using a flat polarographic sensor. The method used was basically that described by Refojo et al (Refojo, M., Holly F., and Leong, F-L., *Contact and Intraocular Lens Medical Journal*, vol. 3, issue 4, p 27 (1977). The values have been corrected for sample thickness.

EXAMPLE IV

A solution containing 70 parts of tertiary-butyl styrene, 30 parts of the prepolymer resin of Example I, 6 parts of acrylic acid, 1 part of tertiary-butyl peroctoate and 2 parts of sec. butyl peroxydicarbonate is cast into film following the procedure of Example III. Physical test values obtained on the film are as follows:

| | |
|---|---|
| Tensile Strength, Ultimate | 3,082 g/mm$^2$ |
| TE Modulus (ASTM D1708) | 91,332 g/mm$^2$ |
| Elongation, Ultimate | 6.4% |
| Tear Strength (Modified ASTM 1004) | 2,497 g/mm of thickness |
| Oxygen Permeability | 4 × PHEMA |

EXAMPLE V

A composition similar to that of Example IV is cast as a rod by filling a vial 2 cm in diameter and 5 cm in height and curing in a water bath at 32° for 3 days and at 45° for 2 days followed by post curing in an air oven at 60° C. for one hour. During the next hour, the temperature is raised gradually to 100° C. followed by one hour at 110° C. The resultant optically clear rod is lathe cut into buttons from which suitable hard contact lenses are fabricated.

EXAMPLE VI

Following the procedure of Examples I and III, additional polymers are prepared and tested. These results are summarized in Table I below. The polymers are clear and suitable for optical use.

TABLE I

| POLYMER | POLYSILOXANE (PARTS) | TERT. BUTYL STYRENE (PARTS) | TEAR FILM STABILIZER MONOMER(1) | PARTS | AUXILIARY MODIFIER MONOMER(2) | PARTS | TENSILE ULTIMATE g/mm$^2$ | TE MODULUS g/mm$^2$ | OXYGEN PERMEABILITY (X PHEMA) |
|---|---|---|---|---|---|---|---|---|---|
| A | 30 | 70 | MAA | 6 | | | 2,238 | 82,149 | |
| B | 40 | 60 | HEMA | 9 | | | 2,007 | 60,881 | |
| C | 50 | 50 | HEMA | 9 | | | 1,050 | 47,955 | |
| D | 55 | 45 | HEMA | 9 | | | | 30,000 | |
| E | 30 | 70 | HEMA | 9 | | | 2,731 | 75,093 | 3.8 |
| F | 20 | 80 | AA | 4 | | | 2,004 | 125,798 | 4.0 |
| G | 25 | 75 | AA | 3.7 | TBA | 25 | | | 2.5 |
| H | 20 | 80 | AA | 6 | | | 1,104 | 110,406 | 3.0 |
| I | 30 | 70 | AA | 3 | | | 3,243 | 86,254 | 4.0 |
| J | 30 | 70 | AA | 6 | | | 3,082 | 91,332 | 3.8 |
| K | 25 | 75 | AA / HEA | 2.5 / 1.3 | TBA | 25 | | | 7.3 |

NOTE(1):
MAA = METHACRYLIC ACID
AA = ACRYLIC ACID
HEMA = HYDROXYETHYL METHACRYLATE
HEA = HYDROXYETHYLACRYLATE
NOTE(2):
TBA = TERTIARY-BUTYL ACRYLATE

EXAMPLE VII

A copolymer is prepared by making a solution of 20 parts of the prepolymer of Example I, 40 parts of the prepolymer of Example II, 40 parts of tertiary-butyl styrene, 6 parts of acrylic acid, 4 parts of 1,3-bis(4-methacryloxybutyl) tetramethyl disiloxane and 3 parts of benzoyl peroxide and then cured to obtain a clear, hard polymer for optical purposes.

EXAMPLE VIII

Following the procedure of Examples II and III, an additional polymer, consisting of 40 parts of poly(organosiloxane) of Example II, 60 parts of tertiary-butyl styrene and 2 parts of acrylic acid, is prepared and tested. The polymer is clear and suitable for hard contact lenses. Physical test values for the polymer are:

| | |
|---|---|
| Tensile Strength, Ultimate | 1,400 g/mm$^2$ |
| TE Modulus (ASTM D1708) | 48,000 g/mm$^2$ |
| Elongation, Ultimate | 150% |
| Tear Strength (ASTM 1938) | |
| Initial | 400 g/mm |
| Propogation | 370 g/mm |
| Tear Strength (Modified ASTM 1004) | 2,580 g/mm |

EXAMPLE IX

To a round bottom polymerization flask, at room temperature is charged 85.4 g of 1,1,3,3-tetramethyl-1,3,-disila-2-oxacyclopentane, 3.1 g of 1,3-bis(4-methacryloxybutyl) tetramethyl disiloxane and 1.3 ml of trifluoromethane sulfonic acid. The reaction is mildly exothermic. The flask's contents are agitated on a shaker overnight. The reactants are neutralized with an excess of sodium bicarbonate, diluted with hexane and filtered to remove the carbonate. The hexane diluted product is then washed three times with water and dried over anhydrous magnesium sulfate. The hexane is removed at reduced pressure. By gel permeation chromatography, it is determined that the polyparaffinsiloxane has 75 ethylene disiloxane repeating units.

EXAMPLE X

A solution containing 70 parts of tertiary-butyl styrene, 30 parts of the prepolymer resin of Example IX, 1 part of acrylic acid, 1 part of tertiary-butyl peroctoate and 2 parts of sec. butyl peroxydicarbonate is cast into film following the procedure of Example III. Physical test values obtained on the film are as follows:

| | |
|---|---|
| Tensile Strength, Ultimate | 1,987 g/mm$^2$ |
| TE Modulus (ASTM D1708) | 38,526 g/mm$^2$ |
| Elongation, Ultimate | 68% |
| Oxygen Permeability | $20 \times 10^{-11}$ cm$^3$cm/(sec.cm$^2$mmHg) |

EXAMPLE XI

Exmple IX is repeated except that the ratio of disilatetramethyloxacyclopentane to bis(methacryloxybutyl) tetramethyl disiloxane is 20:1. The resulting polyparaffinsiloxane monomer has 26 ethylene disiloxane repeating units.

EXAMPLE XII

A solution containing 60 parts of tertiary-butyl styrene, 40 parts of the prepolymer resin of Example XI, 1 part of acrylic acid, 1 part of tertiary-butyl peroctoate and 2 parts of sec. butyl peroxydicarbonate is cast into film following the procedure of Example III. Physical test values obtained on the film are as follows:

| | |
|---|---|
| Tensile Strength, Ultimate | 1,900 g/mm$^2$ |
| TE Modulus | 35,500 g/mm$^2$ |
| Elongation, Ultimate | 70% |
| Oxygen Permeability | $24 \times 10^{-11}$ cm$^3$cm/(sec.cm$^2$mmHg) |

EXAMPLE XIII

The cumulative effect of modulus and oxygen permeability on polysiloxane compositions is compared by multiplying oxygen permeability (in $\times$ PHEMA units) by modulus (in $\times 10^5$ units) to obtain a modulus/oxygen permeability value (MOP). The modified polysiloxane compositions of this invention have an MOP value of at least 2.5. Illustrative compositions, both within and without the scope of this invention and their respective MOP unit value, are shown in Table II below. The polysiloxane of Example I is used in preparing the polymers in this example.

TABLE II
TABLE OF MOP VALUES

| POLYMER | POLYSILOXANE (PARTS) | TERT. BUTYL STYRENE (PARTS) | TEAR FILM STABILIZER MONOMER[1] | PARTS | OTHER MONOMER[2] | PARTS | TE MODULUS g/mm$^2$ | OXYGEN PERMEABILITY (X PHEMA) | MOP |
|---|---|---|---|---|---|---|---|---|---|
| A | 40 | — | AA | 3 | TBA / NPGDA | 40 / 20 | 33,081 | 2.2 | 0.7 |
| B | 30 | 70 | AA | 6 | | | 91,300 | 3.8 | 3.5 |
| C | 30 | 70 | MAA | 6 | | | 92,826 | 3.8 | 3.5 |
| D | 20 | 10 | AA | 4 | TBA | 70 | 94,934 | 2.1 | 2.0 |
| E | 20 | 80 | AA | 6 | | | 125,798 | 4.0 | 5.8 |
| F | 30 | 70 | HEMA | 9 | | | 78,093 | 3.8 | 3.0 |

[1]AA = ACRYLIC ACID
MAA = METHACRYLIC ACID
HEMA = HYDROXYETHYLMETHACRYLATE
[2]TBA = TERTIARY-BUTYL ACRYLATE
NPGDA = NEOPENTYLGLYCOLDIACRYLATE

The preceding examples and methods have been described in the foregoing specification for the purpose of illustration and not limitation. Other modifications and ramifications will naturally suggest themselves to those skilled in the art based on the disclosure. These are intended to be comprehended as within the scope of this invention.

The embodiments of the invention in which an exclusive property or privilege is claimed are defined as follows:

1. A shaped article suitable for use in biomedical applications being a polymer formed by polymerizing (a) one or more polysiloxane monomers $\alpha,\omega$ terminally bonded through divalent hydrocarbon groups to an activated unsaturated group with (b) tertiary butyl styrene and (c) a tear film stabilizer to form a crosslinked three-dimensional polymeric network, said polymer having a tangent modulus of elasticity value of at least 25,000 g/mm$^2$ and an oxygen permeability of at least $10 \times 10^{-11}$ cm$^3$ cm/(sec.cm$^2$ mmHg), said teritiary butyl styrene being present in an amount from 80 to 40 parts per 20 to 60 parts of polysiloxane monomers and the sum of parts equals 100, and wherein 2 to 20 parts of tear film stabilizer are present per 100 parts of tertiary butyl styrene and polysiloxane monomer, said stabilizer being selected from the group consisting of hydroxyethylmethacrylate, hydroxyethylacrylate, hydroxypropylmethacrylate, hydroxypropylacrylate, acrylic acid, methacrylic acid and mixtures thereof.

2. The article according to claim 1 wherein from 80 to 60 parts of tertiary-butyl styrene are present.

3. The article according to claim 2 wherein 70 parts of tertiary-butyl styrene are present.

4. The article according to claim 1 wherein 3 to 12 parts of tear film stabilizer are employed.

5. The article according to claim 1 wherein from 5 to 9 parts of tear film stabilizer are present.

6. The article according to claim 1 wherein the tear film stabilizer is acrylic acid or methacrylic acid.

7. The article according to claim 1 wherein from zero to 30 parts per 100 parts of polysiloxane and tertiary-butyl styrene of auxiliary modifier are present.

8. The article according to claim 7 wherein an auxiliary monomer is selected from the group consisting of tertiary-butyl acrylate, polyethylene glycol methacrylate, polyethylene glycol dimethacrylate, 1,3-bis(4-methacryloxybutyl) tetramethyl disiloxane, polyethylene glycol acrylate, polyethylene glycol diacrylate, divinyl benzene, divinyl alkyl benzene and mixtures thereof.

9. The article according to claim 1 wherein the polysiloxane is a poly(organosiloxane) of the formula

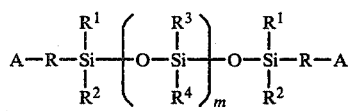

wherein A is an activated unsaturated group, R is a divalent hydrocaron radical having from 1 to about 22 carbon atoms, $R^1$, $R^2$, $R^3$ and $R^4$ can be the same or different and each is a monovalent hydrocarbon radical or a halogen substituted monovalent hydrocarbon radical each having from 1 to about 12 carbon atoms and m is an integer from 0 to 100.

10. The article according to claim 9 wherein A is methacryloxy, R is a divalent hydrocarbon radical having from 1 to about 22 carbon atoms, $R^1$, $R^2$, $R^3$ and $R^4$ can be the same or different and are selected from the group consisting of a monovalent hydrocarbon radical or a halogen substituted monovalent hydrocarbon radical each having from 1 to 12 carbon atoms and m is an integer from 0 to 50.

11. The article according to claim 10 wherein R is an alkylene radical and $R^1$, $R^2$, $R^3$ and $R^4$ are each an alkyl radical having from 1 to 10 carbon atoms.

12. The article according to claim 11 wherein m is a number from 0 to about 25.

13. The article according to claim 1 wherein the polysiloxane is a polyparaffinsiloxane of the formula

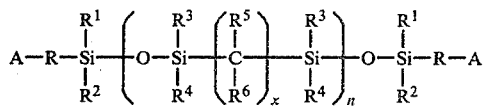

wherein A is an activated unsaturated group; R is a divalent hydrocarbon radical having from 1 to about 22 carbon atoms; $R^1$, $R^2$, $R^3$ and $R^4$ are each independently selected from the group consisting of a monovalent hydrocarbon radical having from 1 to about 12 carbon atoms and a halogen substituted monovalent hydrocarbon radical having from 1 to about 12 carbon atoms and a halogen substituted monovalent hydrocarbon radical having from 1 to about 12 carbon atoms; $R^5$ and $R^6$ can be the same or different and are selected from the group consisting of hydrogen, a hydrocarbon radical containing from 1 to about 12 carbon atoms, a carboxylic acid group, a carboxylic acid ester group represented by the formula —C(O)OR$^7$ wherein $R^7$ is selected from the group consisting of a hydrocarbon group containing from 1 to about 12 carbon atoms and a carboxylic acid amide represented by the formula —C(O)NR$^8$R$^9$ wherein $R^8$ and $R^9$ can be the same or different and each is selected from the group consisting of hydrogen and a hydrocarbon group containing from 1 to about 12 carbon atoms; x is 2 or greater and n is an integer of 1 to about 100.

14. The article according to claim 13 wherein R is an alkylene radical, $R^1$, $R^2$, $R^3$ and $R^4$ are each an alkyl radical having from 1 to 10 carbon atoms and $R^5$ and $R^6$ are each hydrogen or methyl and n is an integer from 1 to 100.

15. The article according to claim 14 wherein n is a number from 1 to about 50 and x is an integer from 2 to 10.

16. The article according to claim 14 wherein n is a number from 1 to about 25 and x is 2 or 3.

17. Wherein the article according to claim 1 is a gas permeable hard contact lens.

* * * * *